May 28, 1968  D. R. DOUGLAS  3,385,041
COMB ATTACHMENT FOR LAWNMOWERS
Filed Aug. 31, 1965
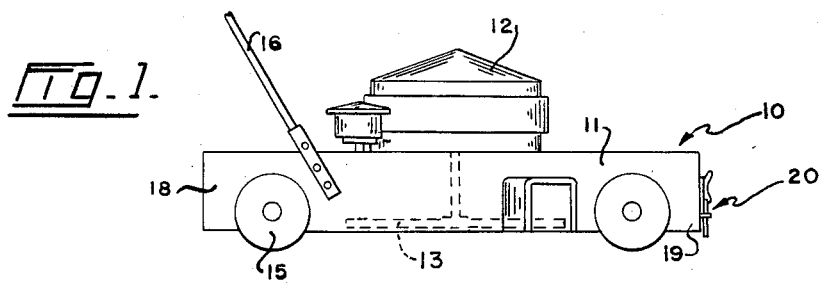
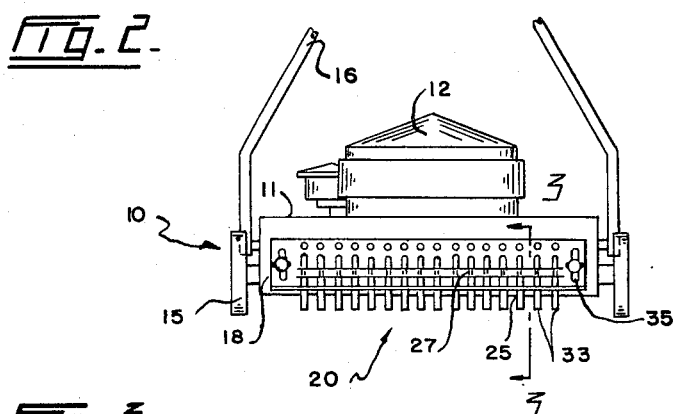
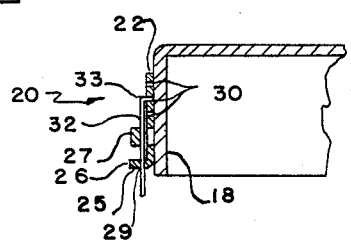
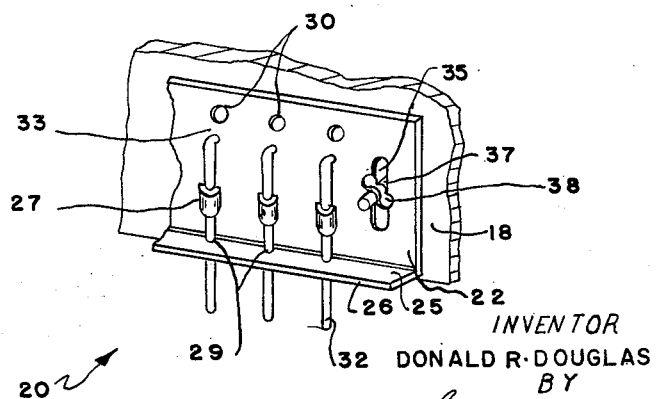
INVENTOR
DONALD R. DOUGLAS
BY
Featherstonhaugh & Co.
ATTORNEYS United States Patent Office 3,385,041
Patented May 28, 1968

3,385,041
COMB ATTACHMENT FOR LAWNMOWERS
Donald R. Douglas, 4367 Quebec St.,
Vancouver, British Columbia, Canada
Filed Aug. 31, 1965, Ser. No. 483,974
8 Claims. (Cl. 56—255)

This invention relates to comb attachments for lawnmowers to clear light trash from the path of the mower and which is more particularly designed to comb and lift the grass in advance of the lawnmower for a more effective cutting thereof.

Lawnmowers, particularly those of the rotary power type, are without the provision of guards and extremely dangerous to operate as any light trash which may be left on the lawn and which may permit passage thereover of the mower, will usually be drawn upwardly into the rotary blade and ejected from beneath the mower with great force, causing injury to the operator and usually some sort of damage to the blade. There have also been frequent occurrences of grievous injuries suffered when a rotary mower has been inadvertently drawn over the operator's foot so as to permit the rotary blade to come into contact with his toes, or the like.

It has also been found that lawnmowers, particularly the rotary type mower, do not provide a smooth even cut in one pass in view of the tendency of some types of grass to grow in a horizontal direction. In order, therefore, to obtain an evenly cut lawn, a raking or combing of the lawn between two passes of the lawnmower is usually required.

It is appreciated that rake attachments have heretofore been designed which, when affixed to a lawnmower, serve both as a safety guard and as a comb to permit effective cutting of the lawn in one pass. However, such rake attachments have not, in the main, been entirely successful. It will be appreciated that both lawnmowers and lawns vary, and therefore a particular comb attachment which effectively permits smooth cutting of the grass after one pass on one type of lawn may not be as effective when used on a lawn of another type. There have been various attempts to make the combs of prior art adjustable to suit lawns of varied growth and texture. However, such attachments have usually been of relatively complicated design and usually require the employment of tools, whereby the adjustments may be made. Such attachments have, in the main, provided only for vertical adjustment of the entire structure and have not provided for varying the stiffness of the tines or teeth of the comb to suit grass having different characteristics. These comb attachments of prior art have also been relatively expensive to manufacture and difficult to repair when breakage occurs.

The comb attachment of the present invention is of strong yet resilient construction, and because of its simplicity, is relatively cheap to manufacture, the tines of which are easy to replace without the use of tools and which provides not only for vertical adjustment of the entire attachment relative to the lawnmower on which it is carried, but provides for easy and simple adjustment of the tines themselves, said latter adjustment providing for variation in the rigidity of the tines and therefore enabling adjustment thereof for lawns of varied texture.

The present invention is easily adjustable to all makes of types of lawnmowers, and which may be secured thereto and removed therefrom, after adaption, without the use of tools.

The present invention comprises an elongated tine holder attachable to said frame member and extending transversely of the mower, a plurality of elongated vertically extending tines slidably secured for vertical movement to the tine holder, each of said tines having a laterally extending detent arranged at its upper end, and detent engaging means formed in the tine holder releasably engageable with the detent of each tine when the lower end of the latter is positioned so as to extend a predetermined distance below the tine holder.

In the drawings which illustrate the invention,
FIGURES 1 and 2 are side and front views, respectively, of a rotary power mower having the comb attachment constructed in accordance with this invention attached thereto.
FIGURE 3 is an enlarged sectional view of the invention taken along line 3—3 of FGURE 2, and
FIGURE 4 is an enlarged isometric view of a portion of the invention.

Referring to the drawings, the numeral 10 generally designates a rotary type power lawnmower having a steel casing 11, the latter also serving as the structural support framework for the operative parts of the mower to which is secured a motor 12 arranged to drive a blade 13. The casing is carried on wheels 15, the mower generally pushed or guided by an elongated handle 16 pivotally connected to the casing.

This casing is of generally rectangular construction having vertical walls 18, the rear and front walls thereof being either planar or somewhat arcuate in the horizontal direction, the wheels are located so that the lower edge 19 of the walls is generally located an inch or two above the ground surface.

The comb attachment herein accorded the numeral 20 comprises a tine holder 22 which is preferably formed from a single sheet of steel stock and has a length substantially the same as the width of the mower upon which it is to be secured. This tine holder is formed having a right angularly bent portion 25 at its lower edge 26, said bent portion serving as a reinforcing rib to provide a certain amount of rigidity thereto. This bent portion, however, does not lend the rigidity to the tine holder that it cannot be bent laterally so as to fit the front or rear walls 18 of the mower should the latter be slightly arcuately shaped.

There is formed on the tine holder, a horizontally extending row of sleeves or loops 27, the latter may be formed in any manner. However, it is preferred, for simplicity of fabrication, that they be formed by making two horizontally extending spaced rows of paired slits in the sheet metal stock and pressing the web between each of the paired slits outwardly out of the plane of the stock, in a known manner, to form said sleeves or loops. These sleeves or loops are spaced above the bent portion 25 and each of them is vertically aligned with a horizontally extending series of holes 29 formed in said bent position at the bend of the latter. The tine holder is also provided with vertically spaced series of perforations 30 spaced above and in line with each of the paired sleeves 27 and holes 29.

The tines of the attachment accorded the numeral 32, are formed of elongated lengths of spring wire and are of sufficient diameter that they may be slidably, yet snugly, inserted through each pair of loops 27 and holes 29, said sleeves and holes thereby maintaining each tine in an upright position tightly, yet slidably, against the vertical face of the tine holder 22. Each tine has a small rectangularly bent portion 33 at its upper end forming a detent which is insertable into any of the perforations 30 and is of sufficient length that, when the bent portion 33 or detent is fitted into the uppermost of the series of perforations 30, the lower end 34 of the tine will extend some distance below the bent portion of the holder.

The tine holder as has been previously described is fitted so that it lies flush against the forward or rear walls of the mower, and is provided at each end thereof with vertically extending slots 35. The holes, not shown, may be drilled through the front or rear of the walls 18 of the mower which will register with the slots 35 when the tine holder is properly located on the walls, and said tine holder fastened to the mower by means of bolts 37 which may be extended through said holes of the mower and the slots 35, and wing nuts 38 tightened thereover.

It will be appreciated that the lowermost portion of each of the tines extending beneath the bent portion 25 of the tine holder is free to flex, the degree of flexibility being determined by its length. Consequently, the degree of flexure of each tine may be adjusted by vertical adjustment of the tine relative to the tine holder. The comb attachment therefore is very versatile in usage. For example, if it is desired to use the attachment as a rake to loosen dead grass cuttings which very often lie about the base of the grass shoots and cause deterioration of the lawn, the tines may be adjusted so that their bent ends or detents 33 are engaged with the uppermost of the perforations 30 so that only a small length of each tine projects below the bent portion 25 of the holder. The holder may then be adjusted relative to the lawnmower so that the lower tips of tines, when the lawnmower is pushed over the lawn, might dig into the dead grass and loosen it, thereby permitting the normal suction generated by the rotating blade to lift and discharge it to the side of the mower where it may be later picked up and disposed of. It will be appreciated that with the comb attachment thus disposed, the relatively rigid tines will serve to dislodge and move any small pebbles or bones which might be in the path of the mower which otherwise might be picked up by the blade and ejected from beneath the casing, an occurrence which frequently results in injury. If, on the other hand, it is desired to simply comb the lawn so as to bring to a vertical position any grass shoots which lie horizontally, the tines may be adjusted so that their bent ends or detents 33 are in the lowermost of the perforations 30 so that a considerable length of tine extends below the tine holder. In this position, the tines are very flexible and are not liable to damage the growing grass through which they pass.

Adjustments may be carried out with relative ease. The tine holder may be adjusted vertically by simply loosening the wing nuts 38, sliding the holder vertically, then again tightening the wing nuts when the holder is properly located. The flexibility of the tines permit ease of withdrawal of their bent ends from the holes 29 either by simply gripping them with the fingers or by slipping a screwdriver or the like between the tines and the holder. The tines may then be slidably moved vertically, the bent end thereof positioned over any selected one of the perforations 30, and the tines then released so as to permit the bent end to enter the selected one of the holes. It will be seen that there is provided a comb attachment of extremely simple construction and, therefore, one which is relatively inexpensive.

It will be appreciated also that the comb attachment of the present invention may be used with any type of mower having a superstructure to which the comb may be attached to depend in front of the mower's cutting elements.

What I claim as my invention is:

1. A comb attachment for lawnmowers, the latter having a frame member ahead of and above the mower's cutting blades, comprising an elongated tine holder attachable to said frame member and extending transversely of the mower, a plurality of elongated vertically extending tines slidably secured for vertical movement to the tine holder, each of said tines having a laterally extending detent arranged at its upper end, and detent engaging means formed in the tine holder releasably engageable with the detent of each tine when the lower end of the latter is positioned so as to extend a predetermined distance below the tine holder.

2. A comb attachment for lawnmowers, the latter having a frame member ahead of and above the mower's cutting blades, comprising an elongated tine holder attachable to said frame member and extending transversely of the mower, a plurality of elongated vertically extending tines slidably secured for vertical movement to the tine holder, each of said tines having a laterally extending detent arranged at its upper end, and detent engaging means formed in the tine holder releasably engageable with the detent of each tine when the lower end of the latter is positioned so as to extend a predetermined distance below the tine holder, said means permitting vertical adjustment of the tines relative to the tine holder.

3. A comb attachment as claimed in claim 1 in which the tine holder is adapted to be secured to the mower for vertical adjustment relative thereto.

4. A comb attachment for lawnmowers, the latter having a frame member ahead of and above the mower's cutting blades, comprising a tine holder formed of a single elongated sheet of rigid material having at least one row of elongated sleeve elements extending beyond a planar face thereof, said holder having at least one hole formed therethrough positioned above and in line with each sleeve element, a plurality of elongated tines slidably extending through the sleeve element and having laterally extending detents at their upper ends in engagement with each of the holes when their lower ends are positioned at a predetermined distance below the holder, and means to secure the tine holder to the frame member, said means permitting vertical adjustment of the holder relative to the mower.

5. A comb attachment as claimed in claim 4 in which the detents comprise laterally extending bent portions at the upper ends of the tines.

6. A comb attachment for lawnmowers, the latter having a frame member ahead of and above the mower's cutting blades, comprising a tine holder formed of a single elongated sheet of rigid material having at least one row of elongated sleeve elements extending beyond a planar face thereof, said holder having a vertically spaced series of holes extending above and in alignment with each of the sleeve elements, a plurality of elongated tines slidably extending through the sleeves and having laterally extending detents at their upper ends engageable with any one of the holes whereby the lower ends of the tines may be selectively positioned at predetermined distances below the holder, and means to secure the tine holder to the frame member, said means permitting vertical adjustment of the holder relative to the mower.

7. A comb attachment as claimed in claim 6 in which the detents comprise laterally extending bent portions at the upper ends of the tines.

8. A comb attachment as claimed in claim 6 in which the tines are of spring wire construction and being of sufficient thickness so as to be fairly rigid except under relatively heavy lateral pressure.

References Cited

UNITED STATES PATENTS

| | | | |
|---|---|---|---|
| 2,559,897 | 7/1951 | Phelps | 56—25.4 |
| 2,564,586 | 8/1951 | Smith et al. | 56—25.4 |
| 2,794,309 | 6/1957 | Tabac | 56—249 |
| 2,882,063 | 4/1959 | Strasel | 56—25.4 XR |
| 2,982,079 | 5/1961 | Schesser | 56—25.4 |
| 3,101,580 | 8/1963 | Schesser | 56—25.4 |

RUSSELL R. KINSEY, *Primary Examiner.*